United States Patent [19]

Wenger et al.

[11] Patent Number: 4,769,251

[45] Date of Patent: Sep. 6, 1988

[54] LOW SHEAR EXTRUSION PROCESS FOR MANUFACTURE OF QUICK COOKING RICE

[75] Inventors: Marc L. Wenger; Gordon R. Huber, both of Sabetha, Kans.

[73] Assignee: Wenger Manufacturing, Inc., Sabetha, Kans.

[21] Appl. No.: 10,327

[22] Filed: Feb. 3, 1987

[51] Int. Cl.[4] .............................................. A23L 1/168
[52] U.S. Cl. ................................... 426/459; 426/448; 426/458; 426/551
[58] Field of Search ............... 426/462, 463, 560, 448, 426/458, 459, 551

[56] References Cited

U.S. PATENT DOCUMENTS

| | | | |
|---|---|---|---|
| 2,629,662 | 2/1953 | Julian et al. | 99/15 |
| 3,117,006 | 1/1964 | Wenger | 426/448 |
| 3,162,536 | 12/1964 | Kaufmann | 99/85 |
| 3,458,321 | 7/1969 | Reinhart et al. | 426/463 |
| 3,579,352 | 5/1971 | Bookwalter et al. | 426/463 |
| 3,846,563 | 11/1974 | Cunningham | 426/158 |
| 4,044,165 | 8/1977 | Baumann | 426/557 |
| 4,383,764 | 5/1983 | Sloin | 366/77 |
| 4,394,397 | 7/1983 | Lometillo et al. | 426/448 |
| 4,423,082 | 12/1983 | Bauernfeind et al. | 426/557 |
| 4,440,794 | 4/1984 | Davies | 426/578 |
| 4,474,473 | 10/1984 | Higuchi et al. | 366/75 |
| 4,500,558 | 2/1985 | Fulger et al. | 426/463 |
| 4,521,436 | 6/1985 | Lou et al. | 426/463 |
| 4,528,202 | 7/1985 | Wang et al. | 426/463 |
| 4,539,214 | 9/1985 | Winter et al. | 426/557 |
| 4,540,592 | 9/1985 | Myer et al. | 426/557 |

FOREIGN PATENT DOCUMENTS 1538067 7/1968 France.

Primary Examiner—Donald E. Czaja
Assistant Examiner—Mary S. Mims
Attorney, Agent, or Firm—Hovey, Williams, Timmons & Collins

[57] ABSTRACT

Quick cooking rice products are manufactured in a low mechanical shear extrusion process by first pre-cooking a rice and water mixture in a preconditioner and then advancing the mixture along the length of an extruder sequentially presenting a cooking zone, a venting zone, a forming zone, and finally an extrusion die to yield an extruded product. Venting of gaseous products removes a significant amount of moisture from the mixture during the time that the latter passes between the cooking zone and the forming zone, and consequently the moisture content of the mixture within the cooking zone can be increased in order to reduce the total mechanical shear imposed on the mixture during the cooking process. The extruded product, once dried, closely resembles rice grain and readily rehydrates without exhibiting slimy or sticky characteristics, and has an increased tolerance to overcooking. A venting device has a rotatable screw for enabling gaseous materials to be discharged from the mixture while substantially preventing the escape of the mixture from the extruder barrel of the extruder.

13 Claims, 1 Drawing Sheet

LOW SHEAR EXTRUSION PROCESS FOR MANUFACTURE OF QUICK COOKING RICE

BACKGROUND OF THE INVENTION

1. Field of the Invention

This invention relates to a method for continuous manufacture of extruded rice products which may be readily rehydrated by immersion of the products in boiling or hot water for 5 to 10 minutes. The method includes the use of a preconditioner to partially pre-cook a rice flour or rice granules and water mixture, and also includes the use of an extruder wherein the rice and water mixture is advanced first through a cooking zone, then through a venting zone and a forming zone, and finally through an extrusion die to yield the products. The mixture is exposed to a minimum of mechanical shear within the extruder by directly injecting steam into the mixture and then removing a significant amount of moisture from the mixture in the venting zone. The extruded products once dried exhibit the characteristics such as good product integrity after rehydration and good tolerance to overcooking without formation of either a slimy or sticky outer surface.

2. Description of the Prior Art

Rice is a well known and important grain, being a staple and primary food for about one-half of the population of the world. However, whole rice grain, whether cooked with hull intact or initially polished to remove the hull, must be immersed for approximately 30 to 40 minutes in boiling water in order to gelatinize the starch and transform the grain into an edible state. Precooked rice, such as parboiled rice, cooks to an edible state in about fifteen minutes. In addition, rice grains for parboiling which have been broken into pieces are undesirable in the package or container and thus are typically separated out and sold at a discount as granules or for rice flour.

Increased attention in recent years has been directed in more technically advanced societies toward quick cooking rice products which can be conveniently rehydrated in hot or boiling water within a time period of five to ten minutes. Advantageously, such products may also be mixed with other foods and cooked in a microwave or conventional oven without the need for pre-cooking the rice on a stove and thereafter draining any excess water. Furthermore, it is known that grinding whole rice grain into rice flour for manufacture of quick cooking rice enables a higher percentage of the grain to be utilized in comparison to the usuable percentage of grain that is available after, for example, polishing of the rice for transformation into white rice for cooking by the consumer.

In general, the known processes for manufacture of quick cooking rice include the steps of mixing a rice and water mixture in an extruder and raising the temperature of the mixture during advancement of the same along the length of the extruder in order to gelatinize the rice starch. Unfortunately, known processes impose an excessive amount of shear on the rice and water mixture within the extruder which causes the rehydrated product to have a sticky surface and agglomerate in any unsatisfactory manner when served. An excess of mechanical shear also reduces tolerance of the extruded product to overcooking which in some cases causes the rehydrated rice to have an unattractive, slimy outer surface, or become mushy and full apart.

Excessive shear of the rice and water mixture in the extruder can, under somme circumstances, decrease product integrity which is measured by the ability of the rice product to spring back to its original configuration after rehydration. An extreme amount of shear also causes a sliminess or stickiness characteristic that results in poor quality. Also, an extreme amount of shear can lead to increased extruder energy consumption and a variety of mechanical problems due to greater wear at elevated temperatures on the extruder components.

Hence, it would be desirable to provide a process for manufacturing quick cooking rice in such a fashion that mechanical shear imposed upon the rice and water mixture is minimized in order to improve the characteristics of the extruder product as well as to reduce energy consumption and the cost of extruder maintenance. Desirably, the process would enable the use of relatively high amounts of moisture during cooking in order to reduce shear, while ensuring that the extruded product is completely cooked before advancing toward a drying station where the products are dried during relatively short periods of time with air at ambient temperatures or temperatures somewhat above ambient.

SUMMARY OF THE INVENTION

The present invention overcomes the disadvantages noted hereinabove by provision of a low shear extrusion process for production of quick cooking rice products which includes the step of passing a rice flour or granules and water mixture through a preconditioner for 20 seconds to three minutes in order to partially pre-cook the mixture at temperatures in the range of from about 150° F. to 210° F. The mixture is then introduced into an extruder for passage first through a cooking zone, then through a venting zone and a forming zone, and finally through an extrusion die to yield an extruded product. The temperature of the mixture within the cooking zone is in the range of from about 180° F. to about 350° F., and preferably within the range of about 235° F. to about 265° F. Pressures within the barrel of the extruder are in the range of 200 psig to 1200 psig.

Importantly, the venting zone provided in the extruder in accordance with the principles of the invention causes significant amounts of moisture in the form of gaseous products to be removed from the rice and water mixture before passage of the latter to the forming zone and subsequently to the die. As a consequence, the ratio of water to rice in the mixture during advancement to the cooking zone can be increased in order to lower the viscosity of the mixture and thereby cause correspondingly less shear to be imposed upon the same. The extruded product exhibits superior integrity after rehydration with a noticeable absence of a slimy feel and appearance of the product surface; moreover, the product has a substantial tolerance to overcooking without measurable detraction from desirable organoleptic properties. The extrusion process utilizes the less marketable, broken rice granules and/or flour to form a product which, once rehydrated, has the quality and appearance of parboiled, whole grains of rice.

Exposure of the rice and water mixture to the venting zone in the extruder advantageously cools the mixture before entering the forming zone and the die. As such, the extruded product is substantially easier to handle before arriving at the drying station because the product retains its shape and can be severed by a clean cut without tearing by use of a knife blade held to the face of the die.

It has been found that application of negative pressures to the venting zone of the extruder greatly facilitates removal of moisture from the mixture in order to enhance the quality of the final product, while also allowing the moisture content of the mixture in the cooking zone to be increased so that the forces of mechanical shear are retained at a minimum. Preferably, the venting zone is equipped with a device having a conical housing connected to a vent and an upright screw positioned in the housing, and the screw has flights for biasing any portion of the rice and water mixture entering the housing back toward the extruder in a direction opposite from the flow of the vented gases.

DETAILED DESCRIPTION OF THE DRAWING

Figure 1:
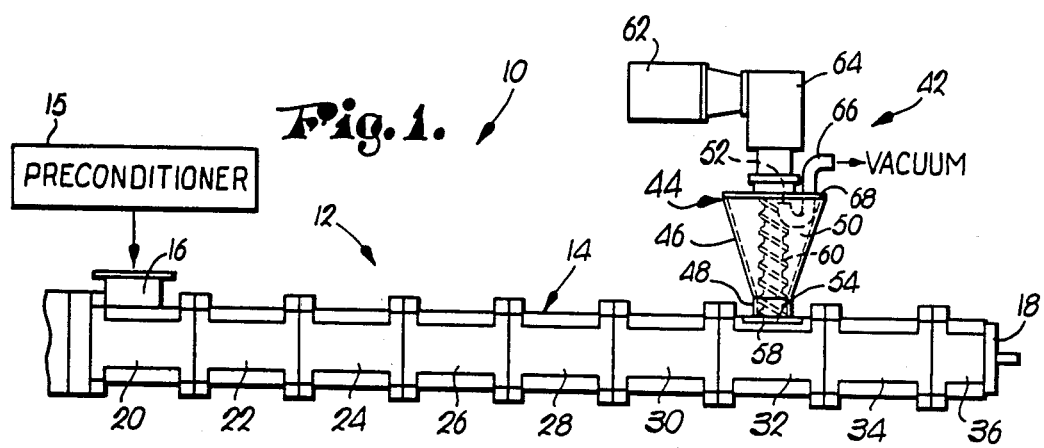
FIG. 1 is a fragmentary, side elevational view in somewhat schematic form illustrating an exemplary extruder used for cooking and extruding a rice and water mixture into quick cooking rice products in accordance with the principles of our present invention.

Turning initially to FIG. 1, an extrusion apparatus 10 is shown and includes an extruder 12 having a barrel 14 with an inlet 16 located below an outlet of a preconditioner 15; the extruder 12 also has an outlet with a die 18. The barrel 14 as depicted comprises nine barrel sections 20–36, although the number of barrel sections may vary without departing from the principles of the present invention.

Figure 2:
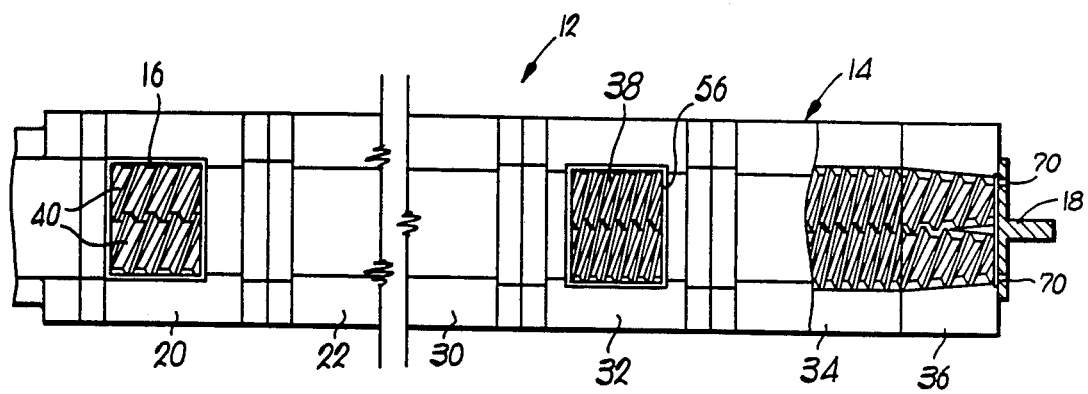
FIG. 2 is an enlarged, fragmentary, plan view of the extruder shown in FIG. 1 with parts broken away in section to reveal twin, flighted screws positioned within a barrel of the extruder.

As shown in FIG. 2, the extruder barrel 14 has walls defining a chamber 38 which is comprised of two frusto-cylindrical, juxtaposed, intercommunicated chamber sections. Two rotatable, flighted, material advancing screws 40 are received in respective sections of chamber 38 and are intermeshed along the majority of the length of the extruder barrel but diverge at the region of the final barrel section 36 and are received within respective, complemental, conical barrel sections in order to split the material being processed into two juxtaposed, noncommunicating streams.

The twin screw food extruder 12 as illustrated in FIG. 2 is manufactured by Wenger Manufacturing, Inc., the assignee of the present invention, and is designated as the Wenger TX Extruder depicted in Wenger Bulletin No. 56-586 which is hereby expressly incorporated into the disclosure herein. The Wenger TX Extruder is also described in U.S. patent application, Ser. No. 06/794,252, filed Oct. 30, 1985 (a continuation of Ser. No. 06/603,195, filed Apr. 23, 1984) which is also hereby expressly incorporated into the present disclosure. The Wenger TX Extruder has been found to provide relatively high pressure differentials in the twin head outlet sections, and on the order of 500 psi to 600 psi; this factor is believed to be at least partially significant in obtaining the unique results of the present invention.

Referring again to FIG. 1, a device 42 for venting barrel section 32 includes a housing 44 having a conically configured portion 46 and a cylindrical portion 48 that interconnects the conical portion 46 and the extruder barrel 14. The enclosed housing 44 has structure defining a passage 50 which has a conical configuration within portion 46 and a corresponding cylindrical configuration within portion 48. The passage 50 has an outlet 52 and an inlet 54 which is in communication with a vent opening 56 (see FIG. 2) in barrel section 32. Housing 44 also includes a lower, horizontal flat plate 58 which is received in leak-resistant contact in vent opening 56 and covers a substantial portion of the same except for a region immediately adjacent passage 50 within cylindrical portion 48.

The venting device 42 further includes a screw 60 having flights for biasing material entering the passage 50 through the vent opening 56 in an opposite direction toward the chamber 38 of barrel section 32. The upright venting device screw 60 is axially rotatable within passage 50, including areas adjacent passage inlet 54, and is powered by a motor 62 coupled to right angle drive 64.

The passage outlet 52 is provided by a pipe 66 which extends through a cover 68 of the venting device housing 44, and the pipe 66 is C-shaped within the housing 44 so that outlet 52 is directly adjacent cover 68. The pipe 66 is vented to the atmosphere, or preferably is coupled to a vacuum source for inducing a negative pressure within passage 50 and for drawing off gaseous products from material being advanced along extruder 12.

In accordance with the present invention, a low shear extrusion process is provided for production of quick cooking rice products, and includes the step of introducing a mixture comprised of rice flour or granules and water into the barrel 14 of extruder 12. The rice and water mixture is initially prepared in the preconditioner 15 by mixing rice with water and elevating the temperature of the mixture to a level of from about 150° F. to about 210° F. for a residence time of 20 seconds to 3 minutes, although a residence time of 1 minute to 2 minutes is preferred. The preconditioning step also may optionally include the step of adding steam to the rice and water mixture during travel of the mixture along the first one-third of the length of the preconditioner 15.

Desirably, the mixture within the extruder chamber 38 ahead of venting barrel section 32 comprises about 80% to 60% by weight of rice and from about 20% to 40% by weight of water. Better results are observed, however, when the mixture ahead of section 32 comprises from about 75% to 70% by weight of rice and from about 25% to 30% by weight of water.

Once the rice and water mixture is introduced into the extruder 12 through inlet 16, the mixture is advanced along the length of the barrel 14 by axial rotation of screws 40. The mixture is sequentially advanced first through a cooking zone in the extruder, then through a venting zone and a forming zone, and finally through holes 70 (FIG. 2) in die 18 to yield an extruder product.

Barrel sections 20–30 shown in FIGS. 1 and 2 for exemplary purposes represent the cooking zone. The rice and water mixture during advancement through the cooking zone has a temperature in the range of from about 180° F. to about 350° F., although preferably the temperature of the mixture in the cooking zone is in the range of from about 210° F. to about 300° F. Best results are observed when the temperature of the mixture in the cooking zone is in the range of about 235° F. to 265° F. Also, the residence time of materials within the cooking zone including barrel sections 20–30 is within the range of about 10 seconds to about 25 seconds, and preferably is approximately 15 seconds.

Barrel sections 32 represents the aforementioned venting zone wherein gaseous products are removed from the rice and water mixture as the latter is advanced by screws 40. As the gaseous products are discharged through vent opening 56 and passage 50, vent device screw 60 is rotated to bias any portion of the rice and water mixture that passes from the chamber 38 through vent opening 56 in an opposite direction back toward chamber 38. As can be appreciated by reference to FIG. 1, provision of the upright passage 50 in cooperation with the vertical screw 60 enables the influence of gravity to cause any portion of the mixture within passage 50 to fall toward the screw 60 which, in turn, then advances the same back toward chamber 38. If desired, a wiping element (not shown) may be positioned within the conical portion of passage 50 to scrape lodged portions of the rice and water mixture from the internal surface of housing conical portion 46.

Preferably, the outlet 52 of passage 50 communicates with a vacuum source which provides a vacuum from about 5 to 20 in. Hg. Better results are observed, however, when the negative pressure within passage 50 is about 15 in. Hg.

The conical portion of passage 50 enables the face velocity of mixture entering the passage 50 to be reduced to a relatively low level as the mixture approaches cover 68 in order to substantially preclude entry of the mixture into vacuum pipe 66. Location of the vent outlet 52 at an upper corner of passage 50 adjacent cover 68 enables a relatively large quantity of the mixture to temporarily flow into passage 50 without danger of entering pipe 66. At the same time, the conical configuration of portion 46 causes mixture collected therein to fall downwardly toward the passage inlet 50 whereupon the positive rotation of screw 60 by motor 62 causes the same to be forced back into the barrel chamber 38.

Again referring to FIG. 1, barrel sections 34 and 36 represent for exemplary purposes the forming zone through which the rice and water mixture is advanced before being extruded through die holes 70. The residence time of the mixture in the forming zone is from about 20 seconds to about 60 seconds, and preferably is approximately 45 seconds. Temperatues of the mixture are within the range of about 130° F. to about 250° F., and preferably within the range of about 180° F. to 220° F. Additionally, the mixture is subjected to a pressure within the forming zone of from about 200 to about 1200 psig, and preferably the mixture in the forming zone is subjected to a pressure of from about 500 psig to about 600 psig.

Both water and steam may be injected into the mixture as the same is advanced along chamber 38. For example, tap water may be injected into the initial barrel section, or barrel section 20, with a temperature in the range of 50° F. to 65° F., and steam may be added downstream of barrel inlet 16 in regions corresponding to barrel sections 24, 26, 28. As another example, water having a temperature of about 180° F. may be injected into the initial barrel section 20, whereby less steam will be required. Other orientations, of course, are also possible.

The barrel 14 of extruder 12 advantageously is jacketed so that coolant water or oil can circulate in the extruder 12 adjacent chamber 38 for subjecting the rice and water mixture to indirect thermal interchange during advancement thereof along the length of barrel 14. Other expedients such as electrical resistance or induction heating could also be employed. Preferably, the mixture during travel through the entire length of extruder 12 has a temperature in the range from approximately 210° F. to approximately 250° F. subject, of course, to the temperature ranges in the cooking zone as set forth hereinabove. Optionally, the temperature of the mixture in the forming zone is less than the temperature of the same in the cooking zone.

As the mixture is passed from the forming zone of extruder 12 and through the die holes to yield an extruded product, a knife (not shown) held under compression against the outside face of die 18 severs the extruded product to the desired rice grain-like configuration. Next, the products are advanced to a drying station in order to render the same suitable for storage and transport.

In preferred forms of the invention, the step of drying the extruded products is carried out until the rice products have a moisture level of about 8% to 14% by weight. However, better results have been observed when the moisture level of the final rice product is in the range of approximately 10% to approximately 12% by weight.

The extruded products during the drying stage are preferably subjected to a temperature of from about ambient, or about 75° F., to about 250° F. for a period of from about 60 minutes to about 10 minutes. Better results have been observed, however, when the extruded products during the drying step are subjected to a temperature within the range of about 180° F. to about 220° F. for a period ranging from about 10 minutes to 20 minutes.

Significant amounts of moisture are removed from the rice and water mixture during passage of the mixture through the venting zone in the extruder 12, and as such greater amounts of moisture may be present within the mixture during passage through the cooking zone, thereby reducing the amount of shear that would otherwise be imposed upon the same. Reducing the shear in the cooking zone decreases the tendency of the rehydrated rice product to undesirably agglomerate due to a sticky outer surface. Moreover, reducing the shear imposed on the mixture in the cooking zone lowers overall energy consumption of the extruder 12. The extruded products exhibit increased tolerance to overcooking without becoming either slimy or sticky, and consequently the quality of the products is superior to products produced by known methods.

Utilization of a vacuum greater than 5 in. Hg. in the venting zone further reduces the amount of mechanical shear imposed on the mixture in the extruder by enabling even higher amounts of moisture, in the form of either tap water or steam, to be added to the mixture during advancement thereof along the cooking zone. The application of a vacuum at the venting zone also substantially prevents formation of air bubbles in the extruded product.

Other ingredients may be added to the rice and water mixture to enhance the characteristics of the extruded product. For example, leavening agents such as calcium phosphate and sodium phosphate may be added to the mixture before the latter enters the cooking zone or, alternatively, the agents may be pumped into the mixture downstream of the venting barrel section 32. These types of additives react with the materials comprising the mixture and cause gaseous bubbles to be formed within the extruded products, thereby slightly expanding the products and facilitating the entry of moisture during rehydration while decreasing the time necessary to accomplish the same. The process is not affected by the type of rice utilized and long grain, short grain or brown rice may all be used, alone or in various combination.

Figure 3:
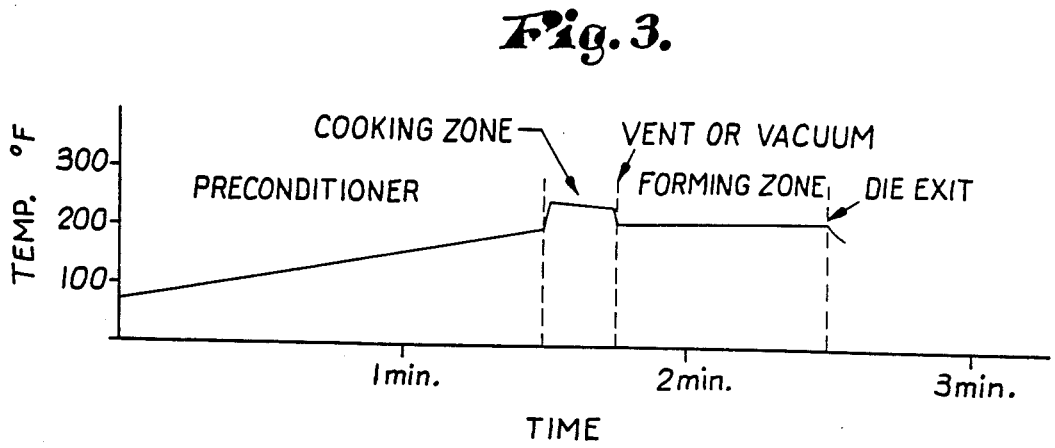
FIG. 3 is a typical temperature profile representing the temperature of a rice and water mixture during passage along the length of a preconditioner as well as the extruder shown in FIG. 1.

FIG. 3 represents for exemplary purposes a typical temperature profile of the mixture during advancement within the preconditioner 15 as well as along the length of barrel 14. As shown, the temperature of the mixture steadily increases during the travel through the preconditioner 15, and then only slightly increases in temperature during advancement through the cooking zone. The temperature of the mixture drops at the venting zone corresponding to barrel section 32, then steadily and slightly increases as the mixture is advanced through the forming zone represented by barrel sections 34, 36, and drops further during passage through the die holes 70. In this example, about 40% of the cooking of the mixture occurs within preconditioner 15, while the remaining precentage of cooking occurs as a result of exposure to temperatures above about 180° F. during passage through the extruder 12.

EXAMPLE 1

In this test, a starting flour mixture of 99.0% by weight long grain rice flour and 1.0% by weight Myvaplex 600 surfactant was prepared. This dry mixture was then fed to a Wenger TX-80 double screw extruder equipped with a preconditioner and an auger feed hopper and processed to obtain a cooked rice product.

The TX-80 machine is of the type schematically illustrated in FIG. 1 and terminates in a double screw cone nose die head, but had a total of eight tubular heads or barrel sections.

A dry starting rice flour mixture (with a moisture content of 11% by weight) was fed into a preconditioner at the rate of 9.8 lbs. per minute and mixed with water introduced into the preconditioner at a rate of 1.0 lbs. per minute. The water and flour mixture in the preconditioner was raised in temperature by the injection of steam introduced at a rate of 0.40 lbs. per minute at 30 psi. Beaters in the preconditioner which may be pitched at different angles to provide a variety of possible residence times were rotated at a speed of 150 rpm and adjusted to retain the mixture in the preconditioner for 1.5 minutes. The mixture when discharged from the preconditioner had a temperature of 200° F. and a moisture content of 23% by weight.

Next, the mixture was fed into the inlet of the extruder at the entrance to the cooking zone, and tap water was introduced to the mixture at the rate of 1.45 lbs. per minute. (However, it is alternatively possible to introduce hot water of a temperature of about 180° F. in order to reduce the required mass flow rate of steam.) In addition, 0.66 lbs. per minute of steam was introduced into the extruder at 125 psi, and the screws of the extruder were rotated at a speed of 150 rpm. The load of the extruder was 11.2 KW (kilowatts). The load on the extruder without the mixture present at 150 rpm was about 2.2 KW so that the increased load required by processing of the mixture therein was about 9.9 KW.

Temperatures of the advancing mixture within the twin barrels were maintained at 210° F., 260° F., 255° F. and 250° F. for the second, third, fourth and fifth barrel section respectively. The moisture content of the flour and water mixture in the cooking zone of the extruder was about 36 percent by weight. The sixth barrel section included the vent opening which was subjected to a vacuum of 10-15 in. Hg. The forming zone of the extruder corresponded to seventh and eighth barrel sections, where the temperatures of the advancing mixture were 209° F. and 216° F. respectively.

Product rate through the extruder, including the total amount of water added in the preconditioner and the extruder, as 12.59 lbs. per minute. The pressure at the last barrel section adjacent the die was 500 psi, and moisture of the extruded product immediately downstream of the die was 25% by weight on a wet basis; therefore, the vacuum removes 11% moisture by weight of the extruded product. Total open area of the die was 0.6 square inches. The extruded products were cut by a knife to a length for resembling grains of rice, and advanced to a dryer. The products in the dryer were subjected to a temperature of 205° F. for 13 minutes, and the dried, extruded products had a final moisture content of 11% by weight. The product was reconstituted in about 7 to 8 minutes and exhibited good product integrity and palatability with no appearance of darkened, burned specks.

EXAMPLE 2

A procedure was carried out substantially as in Example 1, except that the dry starting rice flour mixture was fed into the preconditioner at a rate of 8.311 lbs. per minute and mixed with water introduced into the preconditioner at a rate of 0.834 lbs. per minute. The water and flour mixture in the preconditioner was raised in temperature by the injection of steam introduced at a rate of 0.37 lbs. per minute at 30 psi. Beaters in the preconditioner were rotated at 175 rpm and adjusted to retain the mixture in the preconditioner for 1.5 minutes. The mixture when discharged from the precondition had a temperature of 208° F. and a moisture content of 26.88% by weight.

The flour and water mixture was then fed into the inlet of the extruder at the entrance to the cooking zone, and tap water was introduced to the mixture at a rate of 0.834 lbs. per minute. Steam was also introduced into the mixture at the cooking zone of the extruder at a flow rate of 0.59 lbs. per minute at 100 psi, and the screws of the extruder were rotated at a speed of 175 rpm. The load of the extruder was 20 KW, and the load on the extruder without the presence of the mixture at 175 rpm was about 2.2 KW so that the increased load required by processing of the mixture within the extruder was about 17.8 KW.

In the cooking zone of the extruder, the temperature of the advancing mixture was maintained at 176° F., 200° F., 200° F., and 200° F. for the second, third, fourth and fifth barrel section respectively. The moisture content of the rice flour and water mixture in the cooking zone of the extruder was about 36.4% by weight. A vacuum of 15 in. Hg. was applied to a vent opening in the sixth barrel section. The forming zone of the extruder corresponded to the seventh and eighth barrel sections, and the temperature of the advancing mixture in the eighth barrel section was 169° F.

The rate of product flow through the extruder, including the total amount of water added in the preconditioner and the extruder, was 10.94 lbs. per minute. The pressure at the seventh barrel section was 200 psi, while the pressure at the last barrel section adjacent the die was 500 psi. The moisture content of the extruded product immediately downstream of the die was 26.75% by weight on a wet basis. The extruded, cut products were advanced to a dryer and subjected to temperature of 125° F. for a total of 30 minutes, and the dried products had a final moisture content of 12.53% by weight.

We claim:

1. A low shear process for the production of quick cooking rice products comprising the steps of:

preparing a mixture comprising from about 60 to 80% by weight of rice material selected from the group consisting of rice flour and rice granules and mixtures thereof and from about 20 to 40% by weight of water in a preconditioner by mixing said quantity of rice material with said water and elevating the temperature of the mixture to a level of from about 150° F. to 210° F. and retaining said mixture in said preconditioner for a period of time of about 20 seconds to about 3 minutes, thereby partially cooking the mixture in the preconditioner;

introducing said partially cooked mixture into the barrel of an extruder separate from said preconditioner, said barrel having therewithin a flighted, rotatable screw and an endmost extrusion die;

rotating said screw to sequentially advance said partially cooked mixture along said barrel first through a cooking zone, then through a venting zone and a forming zone, and finally through said extrusion die, to yield an extruded product, said partially cooked mixture having a temperature of from about 180° F. to about 300° F. and is retained therein for a period of from about 10 to 25 seconds in said cooking zone, the maximum temperature of the mixture in said cooking zone being the highest temperature the mixture will experience in the extruder, said mixture having a temperature of from about 130° F. to about 250° F. and being retained from about 20 to about 60 seconds and being subjected to pressures in the range of from about 200 to 1200 psig in said forming zone;

venting gaseous products from said mixture in said venting zone; and drying said extruded product at a temperature and for a period of time sufficient to yield said quick cooking rice products.

2. The process of claim 1, wherein said temperature of said mixture in said cooking zone is in the range of from about 235° F. to about 265° F.

3. The process of claim 1, including the step of subjecting said mixture to a vacuum in said venting zone.

4. The process of claim 3, wherein said vacuum is of a level from about 5 in. Hg to 20 in. Hg.

5. The process of claim 1, said mixture having a temperature in the range of from about 130° F. to about 250° F. in said forming zone.

6. The process of claim 1, wherein the temperature of said mixture in said forming zone is in the range of from about 180° F. to about 220° F.

7. The process of claim 1, wherein said drying step comprises the steps of subjecting the extruded product to a temperature in the range of from about 75° F. to about 250° F. for a period of from about 60 to about 10 minutes.

8. The process of claim 1, wherein said drying step is caried out until the rice products have a moisture level in the range of from about 10% to about 12% by weight.

9. The process of claim 1, including the step of injecting steam or water into said mixture as said mixture is advanced along the length of said cooking zone.

10. The process of claim 1, including the step of subjecting said mixture to indirect thermal interchange during advancement of said mixture along the length of said barrel.

11. The process of claim 1, wherein said step of venting said gaseous products includes the step of rotating a venting device screw in a venting passage communicating with said venting zone, said device screw having flights for biasing said mixture toward said barrel while enabling gaseous products to be vented through said passage.

12. The process of claim 11, wherein said venting device has an area transverse to the rotational axis of said screw which increases in dimension in a direction away from said venting zone of said barrel for reducing the face velocity of any mixture portion flowing in said passage to substantially preclude escape of said mixture portion as said gaseous products are vented.

13. The process of claim 1, said preconditioning step including the step of adding steam and water to said rice.

* * * * *